June 25, 1957  L. J. MEYER  2,796,987
SHELLER AND GRADER
Filed Dec. 1, 1953  2 Sheets-Sheet 1
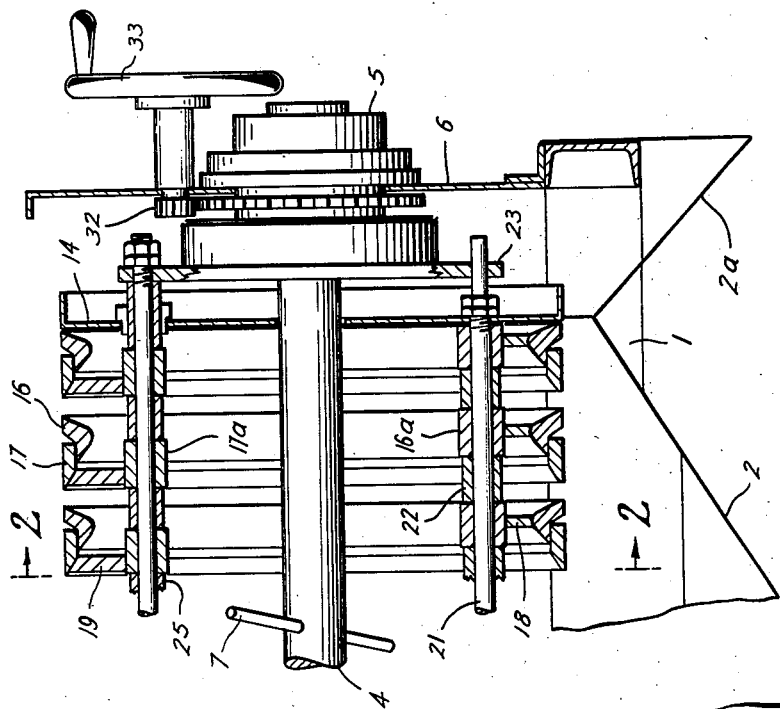
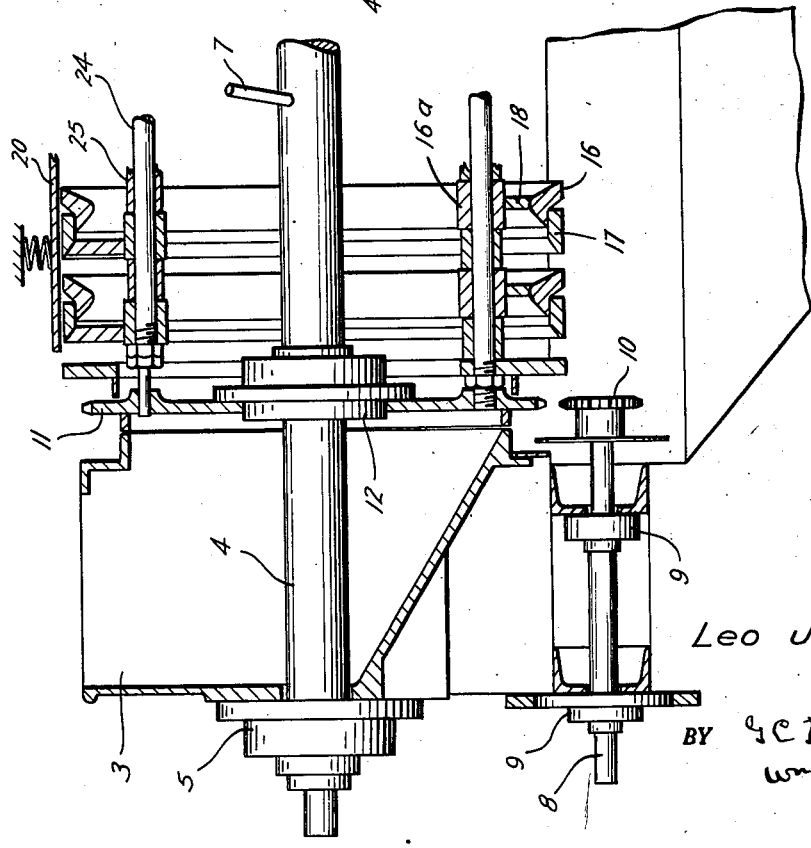
Leo J. Meyer
INVENTOR.
BY *G C Helmig*
*Wm E Ford*
ATTORNEYS

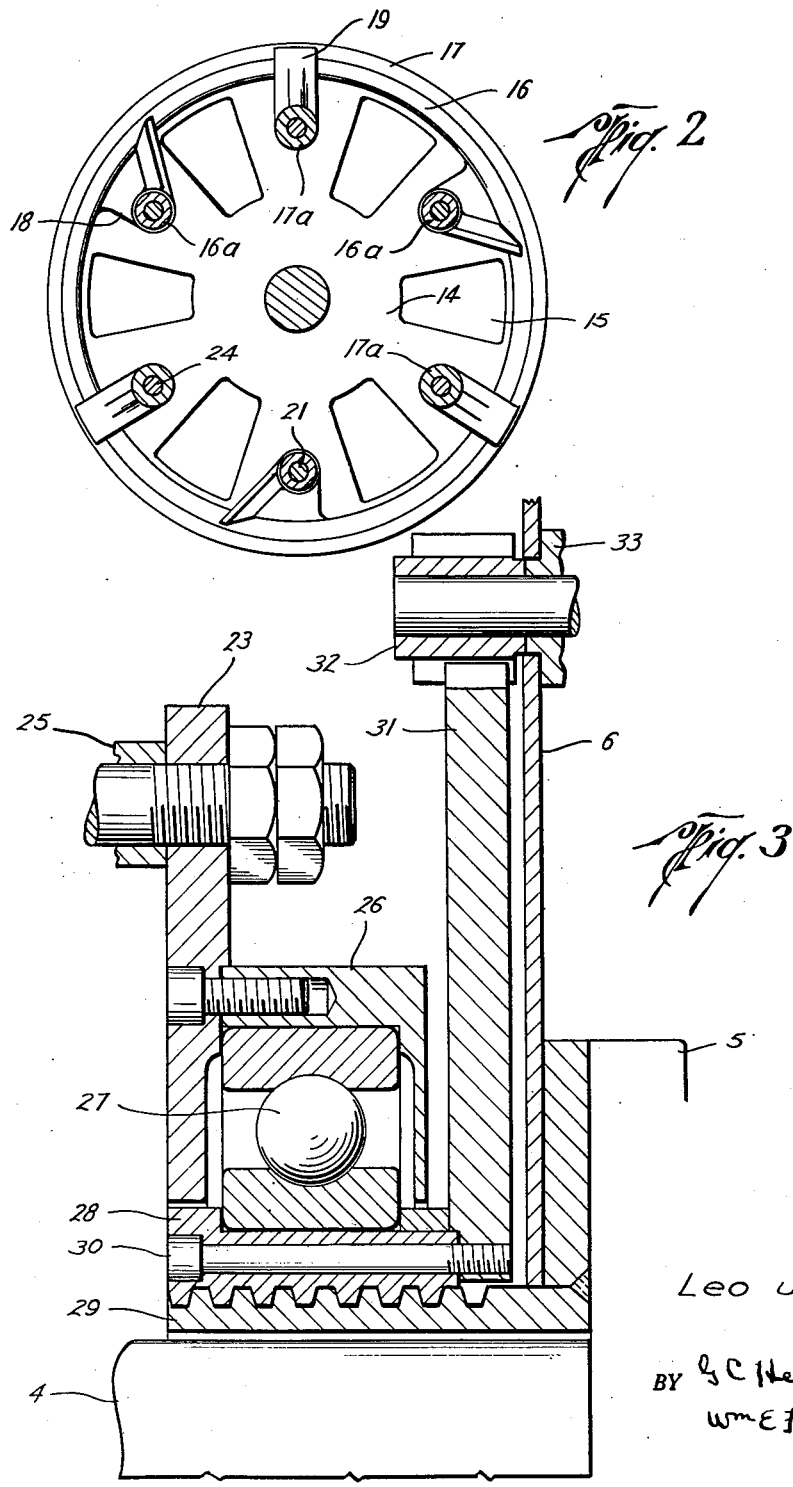

United States Patent Office 2,796,987
Patented June 25, 1957

2,796,987
SHELLER AND GRADER

Leo J. Meyer, San Antonio, Tex.

Application December 1, 1953, Serial No. 395,387

8 Claims. (Cl. 209—98)

This invention relates to rotary barrels and more particularly to an improved mechanism especially adapted for operation on cracked pecans and other nuts for either or both the separation of nut meats from their shells or the sizing and grading of separated nut meats. It may be useful on other types of work but for convenience of disclosure the improved structure will be described as a sheller to operate on nut bodies introduced into the machine after their shells or outer hard coverings have been cracked or broken in a preceding machine operation.

This application is a continuation in part of copending patent application Serial No. 180,413, filed August 19, 1951, and matured into Patent No. 2,669,268, dated February 16, 1954.

An object of the present invention is to enable quick and easy adjustment of particle sizing without disassembling of the machine and whether or not the rotary barrel or drum is rotating at the time of adjustment.

A further object is to provide an improved ring formation and mounting in which a pack of rings, constituting an annularly slotted barrel, is arranged as axially spaced pairs of rings with the rings of each pair slidably overlapping one another and with the corresponding rings of each pair tied together for unison adjustment in controlling the size of the spacing between the pairs of rings and which spaces are continuous around the periphery of the barrel and afford annular uninterrupted discharge slots. Internal ring shape is designed to minimize clogging or packing and insure continuous particle action and for the internal support of the rings. External ring shape is arranged to provide a smooth cylindrical surface for circularly uninterrupted continuous wiping contact therewith during ring rotation of a dislodging blade to clear the slots of particles of size which otherwise might stick and become packed in the annular openings.

Another object is to provide internal ring mounting bosses spaced inwardly of the rings for ample nut clearance passage therearound and arranged with the bosses of each ring in angularly staggered relation with those of the other ring of a pair and all bosses of corresponding rings in axial alignment to receive two sets of supporting tie rods, each fixing the corresponding rings of the pairs to one another whereby relative axial shifting of the two sets of tie rods adjusts the axial size of the continuous annular spacing between the pairs of rings.

A further object is to provide a pair of rotatably supported heads at opposite ends of the pack of rings to carry the opposite ends of the tie rods and serve as supporting means for the barrel assembly, one of the end heads being geared to a power source for rotatably driving the barrel and the other head having fixed connection with a set of tie rods whereby a screw jack control of its axially spaced relation with the driven head, will effect the desired setting of ring spacing.

Other objects and advantages will become apparent during the course of the specification having reference to the accompanying drawings wherein Fig. 1 is a vertical sectional view along the longitudinal axis of the improved machine assembly with parts broken away and the section being substantially on a vertical line diametrically of Fig. 2; Fig. 2 is a detail transverse sectional view as on line 2—2 of Fig. 1; and Fig. 3 is an enlarged detail longitudinal and vertical sectional view illustrating the mounting and adjustment of the barrel end head at the right-hand side of Fig. 1.

Referring to the drawings, the machine includes a suitable supporting frame 1 which may be mounted on legs (not shown) at a convenient height above the floor and by which the rotary barrel or circularly slotted drum is rotatably mounted on a horizontal axis. Beneath the barrel is a collection hopper 2 for particles which fall through the annular slots of the barrel. At the right hand end of the barrel, as seen in Fig. 1, is a chute 2a for disposal of material which passes entirely through the barrel. At the opposite or inlet end of the machine the frame includes an upwardly extending feed hopper 3 through which cracked nuts or other work is introduced to the machine for travel through the barrel during barrel rotation. A supporting shaft 4 extends through the barrel and is mounted at opposite ends in bearings 5—5 carried respectively by an end wall of the hopper 3 and by an end wall 6, extending vertically upwardly from the machine frame at the right hand end of the assembly as seen in Fig. 1.

In a preferred embodiment, as herein illustrated, the barrel assembly and the shaft 4 are relatively rotatable and for the use of the machine as a sheller it is proposed that the shaft 4 turn in its end bearings at a different speed and either in the same or opposite direction in relation to the barrel, and that it carry a series of beaters 7 in the form of outwardly projecting rods arranged in helical succession within and throughout the length of the rotary drum. For clarity of other parts, the drawing only shows a few of the rods 7. These beater rods 7 will move into and out of the tumbling work and by impact therewith, will in the case, for example of cracked nuts, further break the nut shells and dislodge nut meats. The helical succession of rods assists in distributing the particles across the length of the barrel. Power or motor drive of the shaft 4, as in the case of Meyer Patent No. 2,669,268, is through a gear or pulley connection with a projecting shaft end beyond the bearing housing on the feed hopper 3. A similar gear or pulley drive will be operatively connected with the shaft 8 at its left-hand end, as viewed in Fig. 1. This shaft 8 is mounted in bearings 9—9 on the frame below the hopper 3 and terminates at its right-hand end, as viewed in Fig. 1 in a gear or sprocket wheel 10 for drive connection with peripheral teeth on a driven plate or end head 11. The plate 11 is centrally bolted or otherwise fastened to a housing or cage 12 of an anti-friction bearing assembly riding on the shaft 4. The shaft 4 extends through a centrally disposed clearance opening in a sheet metal plate 14 at the opposite end of the barrel.

As seen in Fig. 2, the end plate 14 has a series of circumferentially spaced openings 15 which allow passage therebeyond of any work which is of a size too large to pass through the annular openings in the cylindrical wall of the barrel. Similar passages are provided in the driven head or plate 11 for the movement of the work from the feed hopper 3 into the barrel assembly.

The annularly slotted barrel or rotary drum assembly consists of an axial succession of spaced apart pairs of slidably internested or telescopic male and female rings 16 and 17 respectively, the centermost pairs of rings of the assembly being omitted in Fig. 1 for the sake of clarity. The male and female rings of each pair are sleeved or axially, slidably fitted one within the other so as to overlap in all relative sliding positions and the extent of overlap substantially corresponds with the maximum spacing between the pairs of rings, which is that shown in Fig. 1. It will be noted that the spaces between adjacent pairs of rings constitute annular discharge passages or slots in the peripheral wall and whose axial width is variable according to projected and retracted settings of the nested rings and that each annular slot is of smallest axial width near the drum periphery, with the cooperating side walls of adjoining rings converging outwardly for defining a substantially V shape outward path or guide leading to the narrow slot exit immediate the drum periphery.

It will be noted also that the cylindrical barrel surface is afforded by annularly uninterrupted peripheral faces on both rings 16 and 17 and that these faces as well as the openings between neighboring rings are circumferentially continuous. The annularly smooth barrel periphery is important for slide bearing thereon of a spring pressed or other type of wiping blade 20 suitably mounted on the frame 1 at any convenient height above the tumbling body of material being worked. This blade 20 bridges the circumferential uninterrupted open slots at all times and serves to yieldably push inwardly and free any work which tends to lodge within the slots and rides up out of the tumbling work.

For promoting circular continuity of the drum peripheral surface and the annular slots therein, the several rings are supported interiorly of the barrel, each by means of circumferentially spaced mounting bosses or enlarged heads 16a and 17a which are located by narrow webs 18 and 19 a distance sufficiently inward from the ring as to avoid formation of pockets in which work might collect and lay out of action. Fig. 2 shows each ring with three internal mounting bosses and the bosses of two rings of a pair in staggered or alternate relation. Thus the alternately arranged rings 16 of the pack have their bosses 16a in alignment for the reception of mounting tie rods 21 which carry spacing sleeves or collars 22 fixedly separating the bosses 16a from one another.

At their left ends as viewed in Fig. 1, the tie rods 21 are screw threaded into fixed supporting relation with the driven head 11 and at their opposite ends they are fixedly secured to the plate 14 by suitable mounting nuts and project therebeyond for slidable bearing in an end plate or head 23. The remaining rings 17 are mounted through their bosses on tie rods 24 and are fixedly held apart by spacer collars 25. Opposite ends of the tie rods 24 are also supported in the end heads, but their right hand ends as seen in Fig. 1 are threaded and rigidly secured by nuts to the end plate 23. Near their left hand ends the rods 24 have threaded portions and nuts thereon hold the pack of bosses 17a and spacers 25 in end to end fixed abutment. Beyond the fastening nuts the tie rod ends have reduced diameter projecting portions which slidably bear in openings in the driven head 11.

Referring to the detail sectional view Fig. 3, the end supporting plate 23 has bolted thereto a cap 26 to locate the outer ring of a ball bearing assembly 27 whose inner ring is secured between a pair of shoulders or peripheral ribs on a traveling nut 28. This nut 28 has coarse or heavy internal threads for engagement with corresponding external threads on a stationary supporting sleeve 29 fixed to the end framing plate 6. A series of bolts 30 secure the jack nut 28 to an oscillatory gear 31 in axial sliding mesh relation with a pinion 32 which is fixed on a shaft extension of a hand wheel 33, rotatably mounted in the frame 6. It will be noted that the axial width of the teeth of the pinion 32 exceeds the axial width of the teeth on the gear 31. This is desirable inasmuch as rotation imparted through the handwheel 33 to the gear 31 will screw the traveling nut 28 axially on the stationary sleeve 29, carrying along the gear 31, as well as the end plate 23 and all of the several barrel rings 17 fixed thereto by the tie rods 24. Since the rotary rings 16 are axially stationarily fixed by the tie rods 21 to the opposite head or driven plate 11, the spacing between adjoining pairs of rings 16 and 17 is quickly and easily effected by simple manual adjustment of the handwheel 33.

While only a preferred embodiment has been specifically referred to, it will be understood that the invention is not limited to the exact details shown but that such modification can be made as comes within the scope of the appended claims.

What is claimed is:

1. In a rotary barrel of the character described, a pair of axially spaced rotatable end supports, adjusting means connected to at least one of said supports and operable to adjust said supports axially toward and from one another, a series of coaxial rings located in the space between the supports, arranged in axially spaced pairs with the rings of each pair in telescopic sliding nested relation with one another for varying the spacing between the neighboring pairs of rings, a tie rod extended internally of the rings and fixed to one of said end supports and to one of the rings of each pair of nested rings and another tie rod extended internally of the rings and fixed to the other of said end supports and to the other of the rings of each pair of nested rings.

2. In a rotary barrel of the character described, a pair of rotary end heads, a series of circumferentially spaced rods arranged in two groups, one fixed to one head and the other fixed to the other head, a first series of axially spaced rings surrounding said rods and internally fixed to the rods of one group, a second series of rings having portions in overlapping sliding relation with the first series of rings and surrounding said rods with fixed internal connection to the rods of the other group, and means operably connected to one of said heads and operative to adjust said heads axially relative to one another and coincidentally vary the setting of the rings fixed to the respective heads by said rods.

3. The structure of claim 2 wherein, the rods of one group are fixed at one end to one of the heads and have slidable bearing support at the other end with the other head and the rods of the other group are fixed at one end to said other head and have slidable bearing support at their opposite ends in the first mentioned head.

4. The structure of claim 2 wherein each rod in addition to its fixed connection to a head has a sliding bearing support in the other head.

5. In a rotary barrel of the character described, a pack of axially spaced pairs of co-operating rings, all having smooth peripheral surfaces of the same outer diameter combining to present an annularly slotted circumferentially continuous uninterrupted cylinder, the rings of each pair having adjoining side portions in overlapping sliding relation and being relatively adjustable axially to vary the width of the cooperating rings of the pair and therefore, the axial spacing between adjacent pairs of rings, a blade yieldingly bearing in sliding engagement with the cylindrical surfaces and bridging the annular slots between adjacent spaced rings to dislodge objects from sticking in the slots and projecting from the cylindrical surfaces, a pair of rotary heads at opposite ends of said ring pack, a pair of tie rods, one fixed to one of said heads and to one ring of each pair of rings internally thereof, and the other tie rod fixed to the other head and the other ring of each pair internally thereof and adjustable positioning mechanism operatively connected with said heads for their relative axial adjustment which through the fixed tie rod connections varies the slot width between the rings.

6. In a rotary barrel of the character described, a pack of axially spaced pairs of rings, rotary heads at opposite ends of the ring pack, two sets of tie rods extending internally of the rings and having fixed connections joining one head with one ring of each pair and the other head with the remaining rings, a pair of ring spacing adjusting members having screw threaded engagement with one another for varying their relative positions axially of the rings, means holding one of the members against axial displacement, operating means connected with the other member to apply a rotative force for threading it axially on the axially held member and a connection between the axially threading member and one of said heads for their unisonal axial movement relative to the other of said heads.

7. In a rotary barrel of the character described, a pack of axially spaced pairs of rings, each ring of each pair having a portion in sliding fit overlapping relation with its companion ring and having circumferentially spaced internally extending mounting bosses in angularly spaced relation to the internal bosses of its companion ring and in axially aligned relation with bosses of one of each of the other pairs of rings, two sets of tie rods extending respectively through aligned bosses and fixing corresponding rings of the pairs in two relatively movable assemblies, a pair of rotary end supports for the rods, rotary drive means connected to one end support for transmission of drive thereto and means operatively connected to the other end support for effecting axial adjustment thereof relatively to the driven support, said driven support having fixed connection with adjacent ends of one set of tie rods and slide bearing engagement with adjacent ends of the other set of tie rods and said axially adjustable end support having slide bearing engagement with the opposite ends of the tie rods fixed with the driven support and fixed connection with the tie rods whose opposite ends are slidable in the driven support.

8. In a rotary barrel of the character described, a pack of axially spaced pairs of rings with each of said rings being in telescopic sliding arrangement with its mate and having an inwardly extending mounting boss formed with a tie rod receiving eye spaced inwardly of the internal surface of the ring, a pair of rotatable heads supporting the barrel at each end thereof one of the heads being fixed axially and the other head being adjustable axially, a set of tie rods extending through the mounting boss of and connecting one of each pair of rings in axially spaced relation to one of the heads, another set of tie rods extending through the mounting boss of and connecting the other ring of each pair in axially spaced relation to the other head, means operatively connected with the axially fixed head to apply rotary drive to the axially fixed head and manual means operatively connected with the axially movable head to adjust the axially movable head for varying the axial spacing between adjacent pairs of rings.

References Cited in the file of this patent

UNITED STATES PATENTS

| 2,241,977 | Buck | May 13, 1941 |
| 2,757,695 | Valdes | Aug. 7, 1956 |

FOREIGN PATENTS

| 6,925 | Great Britain | of 1888 |
| 11,312 | Great Britain | of 1908 |